No. 872,522. PATENTED DEC. 3, 1907.
F. W. LETSCH.
REAMER.
APPLICATION FILED JAN. 3, 1906.

Witnesses
J. G. Stinkel
B. C. Rust

Inventor
Frederick W. Letsch
by Foster Freeman & Watson
Attorneys

UNITED STATES PATENT OFFICE.

FREDERICK W. LETSCH, OF BALTIMORE, MARYLAND, ASSIGNOR TO OTT. MERGENTHALER COMPANY, OF BALTIMORE, MARYLAND, A CORPORATION OF DELAWARE.

REAMER.

No. 872,522.   Specification of Letters Patent.   Patented Dec. 3, 1907.

Application filed January 3, 1906. Serial No. 294,483.

*To all whom it may concern:*

Be it known that I, FREDERICK W. LETSCH, a citizen of the United States, and resident of Baltimore, Maryland, have invented certain new and useful Improvements in Reamers, of which the following is a specification.

This invention relates to improvements in rotary cutting tools and more especially to improvements in an expanding reamer.

Figure 1:
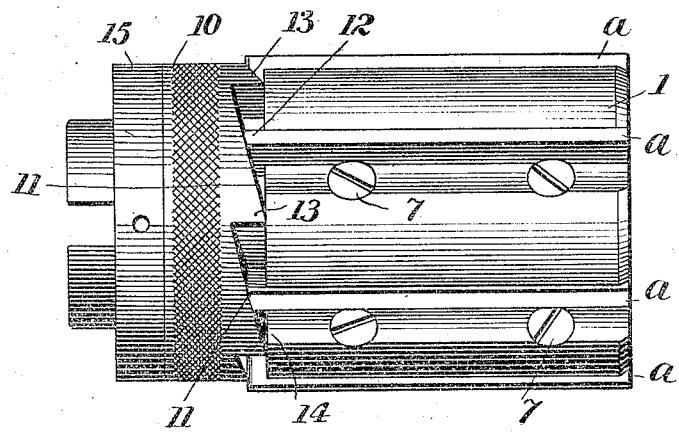
Figure 2:
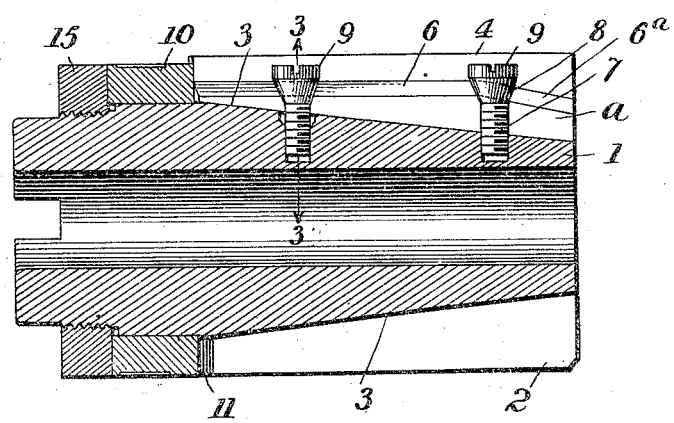
Figure 3:
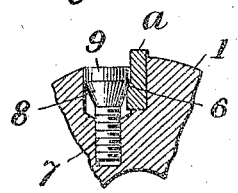
Figure 4:
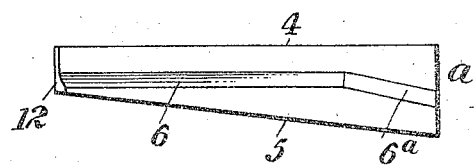

The invention will be described in connection with the accompanying drawing, in which, Figure 1 is a side elevation of an expanding reamer embodying the invention; Fig. 2 is a central sectional view of the same; Fig. 3 is a partial section on the line 3—3 of Fig. 2; and Fig. 4 is a side view of one of the cutters.

Referring to the drawing, 1 indicates the body of the reamer which is cylindrical and provided on its periphery with a series of longitudinal grooves 2 having inclined seats 3 for the cutters $a$. Each of the cutters has a cutting edge 4 which is substantially parallel with the axis of the reamer body and a base 5 having the same inclination as the seat 3 upon which the base rests. The base of the cutter is thicker than its cutting edge and along its forward face is a beveled shoulder 6 which is parallel with the cutting edge 4 and a beveled shoulder $6^a$ at the larger end of the cutter which connects with the shoulder 6 and is inclined away from the cutting edge preferably at an angle greater than the angle between the inclined seats and the axis of the body.

Each of the cutters is clamped to its seat in the reamer by a series of screws 7 having heads which are constructed with conical portions 8 adapted to engage the shoulders 6, $6^a$ and cylindrical portions 9 which are adapted to engage and bear upon the wall of the groove 2 opposite the cutter. As shown, there are two screws to each cutter but additional screws may be used if desired. One of the screws of each series is arranged to coöperate with the inclined shoulder $6^a$ to prevent the cutter from moving toward the forward or outer end of the reamer, as shown in Fig. 2. It will be evident that when the screw is turned down tightly upon the shoulder $6^a$, the cutter will be locked positively against endwise movement toward the forward end of the reamer.

By adjusting the cutters longitudinally in the slots 2 the diameter of the circle drawn through the cutting edges may be increased or diminished. I provide means for uniformly adjusting the several cutters as follows: Upon the rear end of the body is a rotatable ring or sleeve 10 having a series of inclines 11 on its forward edge, there being one incline to each cutter. The rear ends 12 of the cutters are preferably beveled to correspond to inclines. The ring 10 is on a reduced portion of the body and the teeth 13 formed by the inclines are adapted to engage and be clamped against the shoulder 14 separating the reduced portion from the main part of the body. In the rear of the toothed ring 10 is a clamping ring 15 which is threaded upon the body and adapted to clamp the toothed ring 10 in any desired position.

When it is desired to change the cutting diameter of the reamer, the ring 15 is turned back slightly to release the toothed ring 10 and the screws 7 are loosened. The toothed ring 10 is then turned one way or the other as may be desired and reclamped against the shoulder 14. The cutters are then moved against the inclines and fastened in position by the screws. By turning down the forward screw first upon the incline $6^a$, the cutter will be held securely against its incline as the tendency of the incline $6^a$ is to force the cutter rearward.

The reamer above described is simple in construction and comparatively cheap to build. The cutters may be adjusted quickly and easily and they are held in position very securely when adjusted.

It will be evident that some of the features of my invention are not strictly limited to reamers as they may be employed in other rotary cutters.

Having described my invention what I claim and desire to secure by Letters Patent is, 1. In a rotary cutting tool, the combination with a cylindrical body having longitudinal grooves in its outer surface, of cutters seated in said grooves, and screws for clamping the cutters in position, each cutter having a shoulder parallel with its cutting edge, and a second shoulder inclined to its cutting edge, the screws bearing against said shoulders to clamp the cutters in position, as set forth.

2. In a rotary cutting tool, the combination with a cylindrical body provided with longitudinal grooves having inclined seats, of cutters having inclined bases adapted to said seats, each cutter having a clamping shoulder substantially parallel to its cutting edge and a shoulder inclined away from the cutting edge at an angle greater than the angle between inclined seats and the axis of the body, and screws adapted to bear on said shoulders to clamp the cutter to its seat.

3. In a rotary cutting tool, the combination with a body having longitudinal grooves in its periphery and inclined seats at the bottom of the grooves, of cutters having inclined bases adapted to be seated in said grooves and adjustable lengthwise therein, means for clamping the cutters on said seats and a rotatable ring on said body having a series of inclines on its forward edge adapted to coöperate with the rear ends of the cutters, for the purpose set forth.

4. In a rotary cutting tool, the combination with a body having longitudinal grooves in its periphery, of cutters seated in said grooves, a ring upon a reduced portion of the body and having a series of teeth adapted to be clamped against the shoulder separating said reduced portion from the main portion of the body, inclines on said teeth coöperating with the cutters, and means for clamping said toothed ring against said shoulder in any desired position.

5. In a rotary cutting tool, the combination with a cylindrical body having longitudinal grooves in its periphery, the bottoms of said grooves forming inclined seats, of tapering cutters seated in said grooves and having inclined shoulders at their larger ends, screws seated in said body and bearing upon said inclined shoulders, whereby the cutters are prevented from moving forward, a ring rotatably mounted on the body and having inclines adapted to bear against the narrower ends of said cutters, and means for locking said ring in any desired position, whereby the cutters are positively locked against endwise movement in either direction.

6. A cutter for a rotary cutting tool having a cutting edge, a base inclined to said cutting edge, a clamping shoulder substantially parallel to the cutting edge and a second shoulder inclined to said cutting edge, for the purpose set forth.

In testimony whereof I affix my signature in presence of two witnesses.

FREDERICK W. LETSCH.

Witnesses:
EMIL R. DENHARD,
B. C. RUST.